Aug. 20, 1968  T. VALLE  3,397,876
LIQUID-SOLID REACTION APPARATUS
Filed Jan. 14, 1966  2 Sheets-Sheet 1
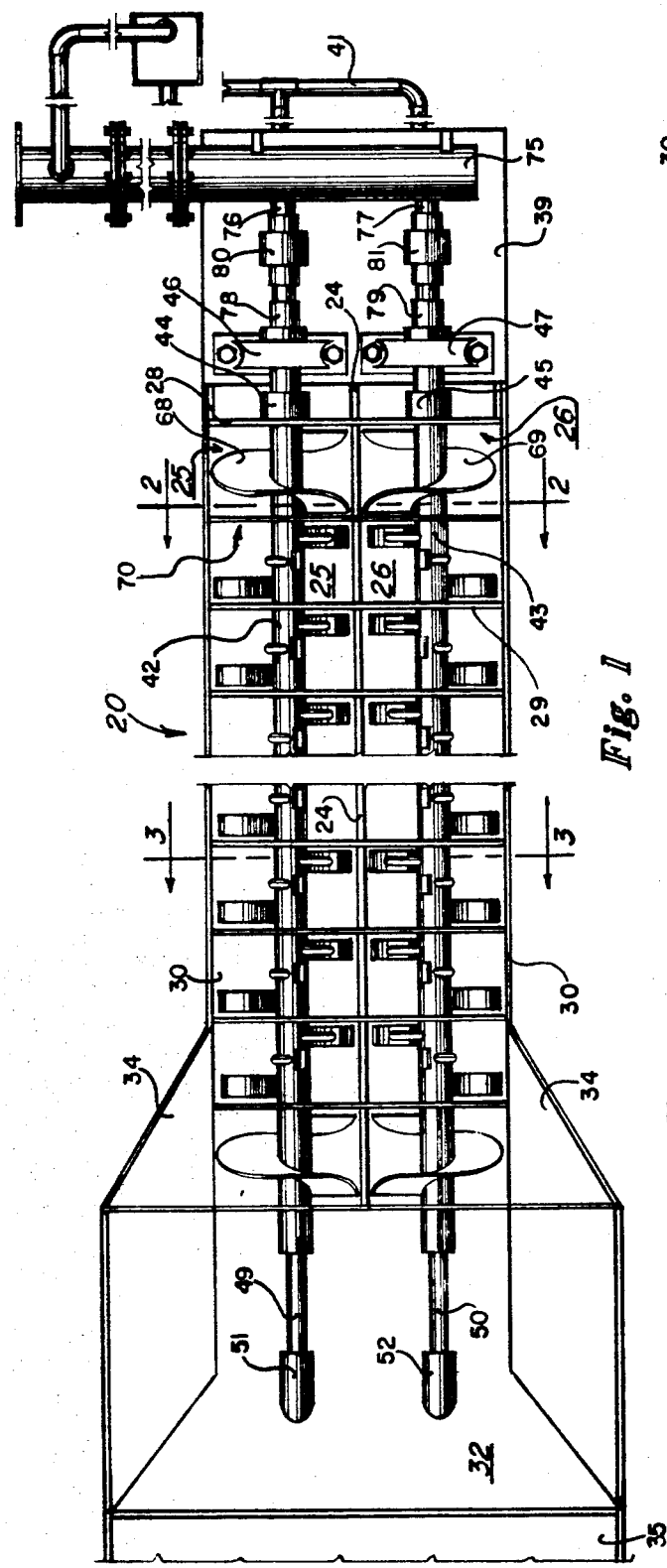
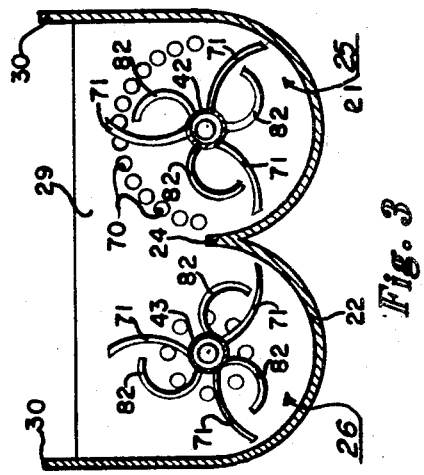
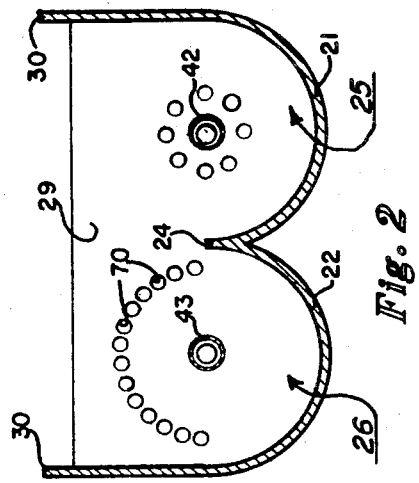
INVENTOR
*Thomas Valle*
BY
*Ralph F. Crandell*
ATTORNEY

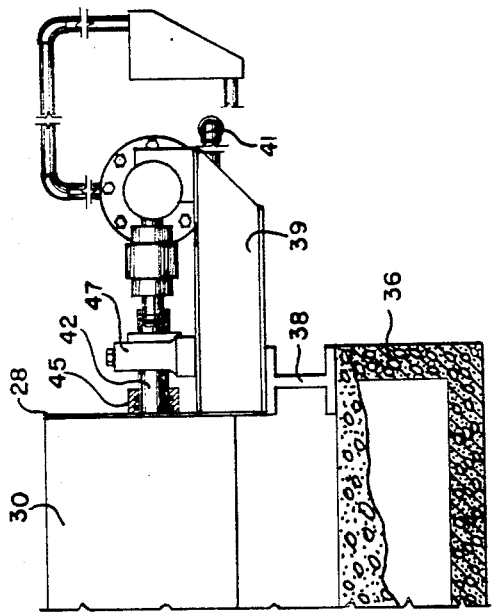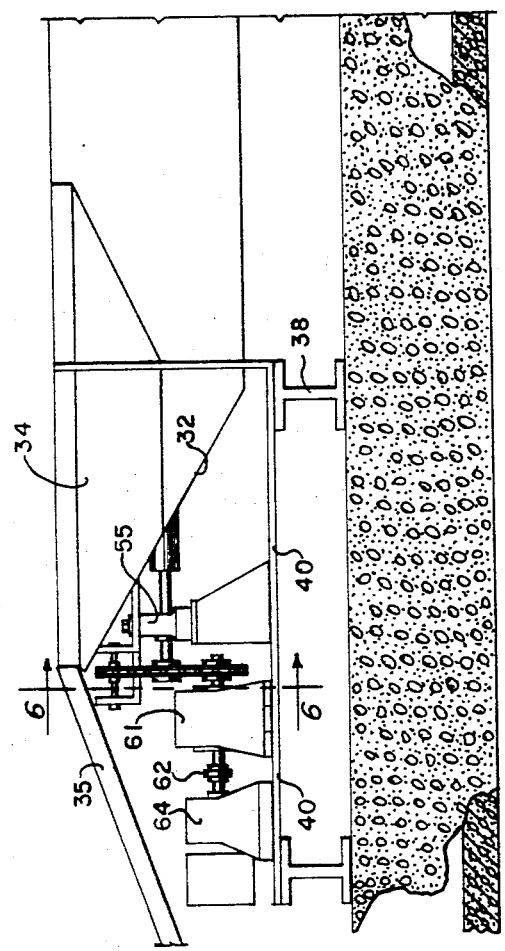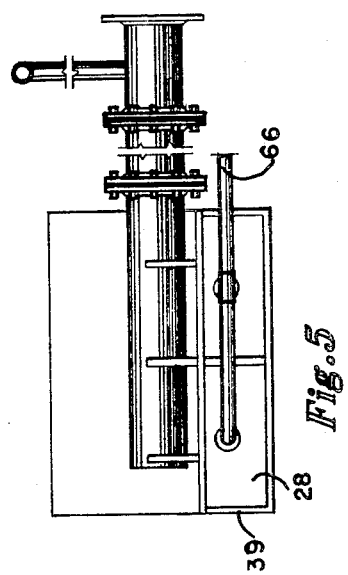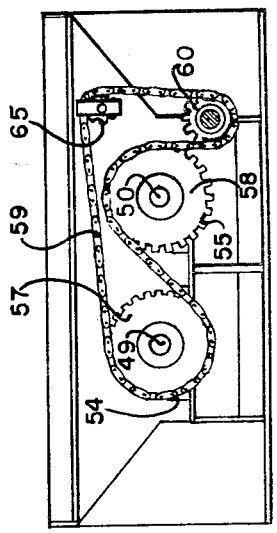

United States Patent Office 3,397,876
Patented Aug. 20, 1968

3,397,876
LIQUID-SOLID REACTION APPARATUS
Thomas Valle, Idaho Springs, Colo., assignor to The Fall River Exploration and Mining Company, Idaho Springs, Colo., a corporation of Colorado
Filed Jan. 14, 1966, Ser. No. 520,554
3 Claims. (Cl. 266—22)

ABSTRACT OF THE DISCLOSURE

The disclosure relates to an apparatus for use in carrying out a continuous liquid-solid reaction process. The apparatus comprises an elongated tank having a plurality of transverse partitions dividing it into a plurality of serially aligned chambers. A liquid-solid slurry is introduced into a chamber at one end of the apparatus. Openings are provided in each of the partitions so that the slurry flows serially through the chambers. A pair of shafts extends through the apparatus, each shaft having an agitator in each chamber. The shafts are hollow and nozzles extend outwardly therefrom adjacent each paddle for discharging a liquid into the slurry in each chamber.

The present invention relates to a liquid-solid reaction apparatus, and more specifically to a novel horizontal, multiple-stage, reaction chamber for use in carrying out liquid-solid reactions wherein the solid is suspended in the liquid to form a slurry. The invention finds particular but not necessarily exclusive use in connection with the production of copper by the reaction of dilute copper sulphate liquors with iron in the form of finely divided powders or particles suspended in the copper sulphate liquor to form a slurry whereby a reaction takes place in which an iron sulphate solution and solid copper particles are formed.

It is the principal object of the present invention to provide an apparatus for carrying out a liquid-solid reaction, such as the production of copper from copper sulphate solutions, which apparatus is highly efficient, relatively inexpensive, susceptible of ready and efficient maintenance, and enables the liquid-solid reaction process to be carried out in a continuous manner.

Another object of the present invention is to provide an apparatus of the foregoing character wherein the process is carried out continuously and without the necessity of charging the liquid and solid reagents in batch form.

Still a further object of the present invention is to provide an apparatus of the foregoing character wherein additional fresh liquid or other reagents may be introduced at intermediate stages without interrupting the continuous process.

An illustrative embodiment of the invention is shown in detail in the drawings wherein:

FIGURE 1 is a plan view of a horizontal, continuous, liquid-solid reaction apparatus embodying the present invention.

FIGURE 2 is a section view taken substantially in the plane of line 2—2 on FIGURE 1.

FIGURE 3 is a section view taken substantially in the plane of line 3—3 on FIGURE 1.

FIGURE 4 is a side elevation view of the apparatus shown in FIGURE 1 and illustrating the same in use with a settling tank.

FIGURE 5 is a front end elevation view of the apparatus shown in FIGURE 4.

FIGURE 6 is a section view taken substantially in the plane of line 6—6 on FIGURE 4.

In carrying out a continuous liquid-solid reaction process, such as a copper precipitation process, in apparatus embodying this invention, the liquid reagent is mixed with the solid in any suitable mixing apparatus. For example, dilute copper sulphate liquor is mixed with sponge or powdered iron particles in an amount calculated to effect the complete removal of the copper from the liquor and the substitution therefor of iron from the iron particles. The resultant slurry must be maintained as a suspension of solid particles in the liquid for a sufficient period of time to allow the reaction to be completed. For this purpose, it is desirable that the slurry be continuously agitated and mixed so that the solid particles are maintained in suspension in the liquid thereby insuring a continuous contact between the particles and the liquid so that the reaction may proceed in the most expeditious manner. The illustrative continuous precipitation apparatus embodying this invention and shown in the drawings achieves this purpose.

Turning to the drawings, the apparatus there shown comprises a horizontal, elongated tank, indicated generally at 20, having a pair of aligned, concave cylindrical bottom walls 21, 22, terminating in a common central wall 24 and defining a pair of parallel adjacent troughs 25, 26. The tank is provided with a front end wall 28, a plurality of intermediate walls 29 dividing the tank into a plurality of spaced serially aligned chambers, each of which is formed of a portion of the two troughs 25, 26 so as to define side by side compartments enclosed by the cylindrical bottom walls 21, 22 of the troughs, the intermediate wall 24, the transverse wall panels 29 and the exterior walls 30 of the tank.

At its discharge end, the tank is enlarged by the provision of upwardly and outwardly sloping walls constituting an extension of the main tank walls. More specifically, the concave bottom walls 21, 22 merge into an upwardly sloping bottom wall panel 32 and the exterior walls 30 of the tank terminate in upwardly and outwardly sloping walls 34 defining, with the bottom panel 32, an outlet chamber terminating in a chute or conduit 35 directed to a settling tank 36. In the illustrative construction shown, the settling tank 36 forms the foundation for supports 38 on which the apparatus is mounted. The tank 20 is provided at each end with support frames 39, 40 which serve to support the tank 20 on the foundation supports 38 as well as to support auxiliary operating equipment for the apparatus.

A liquid-solid slurry is formed in any convenient tank or other apparatus (not shown) and is introduced into the first chamber defined between the front wall 28 and the next intermediate panel 29 through an appropriate supply conduit 41. For distributing and mixing the liquid-solid slurry as it flows through the various chambers of the apparatus there is positioned in each trough 25, 26 a hollow shaft 42, 43 respectively. At the inlet or front end of the tank 20, the shafts extend through seals 44, 45 in the end wall 28 and are journaled in bearings 46, 47 supported on the frame support 39. At the discharge end of the tank, the hollow shafts 42, 43 are closed by any appropriate means such as solid shaft portions 49, 50, respectively, which portions in turn extend through seals 51, 52 in the upwardly sloping end wall 32 of the tank and, externally of the tank, are supported in bearings 54, 55 mounted on the frame 40.

The shafts are rotated in opposite directions by means of sprocket gears 57, 58 on the free ends of the solid shaft portions 49, 50, which gears are driven by a chain 59 drivingly connected to the output gear 60 of a transmission 61 driven through a coupling 62 by a motor 64. An idler gear 65 is provided for supporting the chains 59, and is adjustable for purposes of adjusting the tension in the chain 59.

When a liquid-solid slurry, such as a solution of copper sulphate with finely divided iron particles suspended therein, is introduced into the first chamber 30 through the conduit 41, it is maintained in an agitated condition in the chamber 30 and at the same time thoroughly mixed by means of auger-like blades 68, 69 secured to the hollow shafts 42, 43 so as to be positioned within the two trough portions 25, 26 of the first chamber. As the chamber becomes filled with slurry, the slurry flows through openings 70 defined in the intermediate walls 29 into the next serially aligned mixing chamber 30. Referring to FIG. 2, the openings 70 corresponding to one trough 25 are placed in the configuration of a circle closely surrounding the shaft 42, while the openings in the other side of the plate 29, corresponding to trough 26, define an arcuate pattern spaced from and around the shaft. The foregoing pattern is reversed in each succeeding plate so as to provide a tortuous path for the slurry. With the above-described configuration of holes or apertures through each partition, the flow pattern of the slurry is reversed from chamber to chamber.

Additionally the slurry in each chamber is agitated by means of a plurality of radially extending arcuate paddles 71 affixed to each of the shafts so as to stir the slurry in each chamber. Within the confines of the chamber defining walls the paddles may be axially spaced one from the other so as to insure that the slurry throughout each chamber is adequately stirred. In order to insure effective agitation, the paddles 71 are arcuate or concave in the direction of shaft rotation so as to impart a constantly swirling movement to the slurry in each chamber. As shown in FIG. 3, three such paddles 71 are provided on each shaft at a point corresponding to each of the chambers. Any desired number of chambers or stages may be employed depending upon the reaction time desired, it being readily understood that the more chambers or stages used, the longer the reaction and contact time.

In some reactions it is desirable to introduce further fresh liquid or liquor to the process at intermediate stages. For this purpose, the liquor or solution is introduced interiorly of each of the hollow shafts from a manifold 75 having outlet conduits 76, 77 joined to the rotating shafts 42, 43 by sealing joints 78, 79 (FIG. 4). To insure proper alignment and thereby reduce the wear of the sealing joints 78, 79 the inlet conduits 76, 77 include flexible coupling units 80, 81. As the shafts rotate, liquid flows out into each chamber through radially extending nozzles 82 each of which is curved so that each nozzle directs fluid toward each of the paddles 71. By directing the freshly introduced fluid towards the paddles, the latter act as baffles and serve to thoroughly mix the fresh incoming liquid with the slurry in the chambers.

When the reaction has been completed in the serially aligned chambers, the slurry flows through the discharge conduit 35 to the settling tank 36 from which spent liquor is exhausted and the desired solids retained. In the case of a copper precipitation process, the liquor now comprising an iron sulphate solution, will be withdrawn and discarded or reused in the process and metallic copper will be recovered from the settling tanks.

I claim as my invention:

1. Apparatus for use in carrying out a continuous liquid-solid reaction process comprising, in combination, an elongated tank, said tank having a longitudinally extending center ridge and a pair of arcuate bottom panels defining a pair of spaced elongated troughs in the bottom thereof, a plurality of transverse partitions dividing said tank into a plurality of serially aligned chambers, a pair of parallel hollow shafts extending through said chambers parallel to said troughs, means for rotating said shafts, means for introducing a liquid-solid slurry into the first one of said chambers, said partitions defining a plurality of openings therethrough so that slurry flows serially through said chambers, means comprising radially extending arcuate paddles on each of said shafts disposed in said chambers for agitating the slurry therein, means for supplying fresh liquid interiorally of said shafts, nozzle means extending radially outwardly from said shafts adjacent each of said paddles for discharging said liquid from said shaft and against said paddles thereby introducing fresh liquid into the slurry in said chambers, and means for discharging slurry from the last of said chambers in said series.

2. Apparatus for use in carrying out a continuous liquid-solid reaction process comprising, in combination, an elongated tank, a plurality of transverse partitions dividing said tank into a plurality of serially aligned chambers, means for introducing a liquid-solid slurry into the first one of said chambers, said partitions defining a plurality of openings therethrough so that slurry flows serially through said chambers, a pair of parallel, hollow shafts extending longitudinally through said chambers, agitating means in said chambers comprising radially extending arcuate paddles on said shafts, a plurality of nozzles extending radially from each of said shafts in each of said chambers, for introducing fresh liquid into the slurry in said chambers, each said nozzle having an opening therein directed toward an adjacent paddle, and means for discharging slurry from the last of said chambers in said series.

3. Apparatus for use in carrying out a continuous liquid-solid reaction process comprising, in combination, an elongated tank, a plurality of transverse partitions dividing said tank into a plurality of serially aligned chambers, means for introducing a liquid-solid slurry into the first one of said chambers, said partitions defining a plurality of openings therethrough so that slurry flows serially through said chambers, a pair of parallel shafts extending through said chambers, means fixed in said shafts on each of said chambers for agitating the slurry therein, a portion of said openings in each of said partitions being arranged to closely surround one of said shafts in a generally circular pattern and to the remaining portion of said openings in each of said partitions being spaced from the other of said shafts in a generally arcuate pattern, and means for discharging slurry from the last of said chambers in said series.

References Cited

UNITED STATES PATENTS

| | | | |
|---|---|---|---|
| 1,152,693 | 9/1915 | Barton et al. | 23—285 |
| 2,053,876 | 9/1936 | Pfau et al. | |
| 2,242,979 | 5/1941 | Muncie | 23—285 X |
| 2,314,871 | 3/1943 | De Back | 134—65 |
| 2,976,126 | 3/1961 | Seymour | 23—285 X |
| 3,057,702 | 10/1962 | Pierce et al. | 23—285 |
| 3,150,934 | 9/1964 | Hazard | 23—285 X |
| 3,297,410 | 1/1967 | Lisle | 198—211 X |

FOREIGN PATENTS

| | | |
|---|---|---|
| 767,322 | 1/1957 | Great Britain. |
| 563,367 | 6/1958 | Belgium. |

J. SPENCER OVERHOLSER, *Primary Examiner.*

R. S. ANNEAR, *Assistant Examiner.*